: US 8,965,951 B2
(45) Date of Patent: Feb. 24, 2015

(12) United States Patent
Rhim et al.

(54) METHOD AND APPARATUS FOR PROVIDING/RECEIVING WEB-BASED SERVICE OF PLURALITY OF SERVICE PROVIDERS

(75) Inventors: Eun-hee Rhim, Yongin-si (KR); Sung-jin Park, Suwon-si (KR); Hyok-sung Choi, Seoul (KR); In-chul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 12/186,828

(22) Filed: Aug. 6, 2008

(65) Prior Publication Data

US 2009/0043842 A1    Feb. 12, 2009

Related U.S. Application Data

(60) Provisional application No. 60/954,099, filed on Aug. 6, 2007.

(30) Foreign Application Priority Data

Apr. 10, 2008  (KR) .......................... 10-2008-0033354

(51) Int. Cl.
| | | |
|---|---|---|
| G06F 15/16 | (2006.01) | |
| H04N 21/643 | (2011.01) | |
| H04N 21/258 | (2011.01) | |
| H04N 21/40 | (2011.01) | |

(Continued)

(52) U.S. Cl.
CPC ... *H04N 21/64322* (2013.01); *H04N 21/25891* (2013.01); *H04N 21/40* (2013.01); *H04N 21/6125* (2013.01); *H04N 7/173* (2013.01)

USPC .......................................... 709/203; 709/231

(58) Field of Classification Search
CPC ... H04N 7/173; H04N 21/40; H04N 21/6125; H04N 21/64322
USPC .......................................................... 709/231
See application file for complete search history.

(56) References Cited

U.S. PATENT DOCUMENTS

| | | | |
|---|---|---|---|
| 6,112,228 A | * | 8/2000 | Earl et al. ....................... 709/205 |
| 6,244,758 B1 | * | 6/2001 | Solymar et al. ................ 709/224 |

(Continued)

FOREIGN PATENT DOCUMENTS

| | | |
|---|---|---|
| KR | 2003-0024297 A | 3/2003 |
| KR | 1020050094694 A | 9/2005 |

(Continued)

OTHER PUBLICATIONS

Advogato, RSS Disposition Hinting Proposal, http://www.advogato.org/article/852.html.*

(Continued)

*Primary Examiner* — Emmanuel L Moise
*Assistant Examiner* — Robert Shaw
(74) *Attorney, Agent, or Firm* — Sughrue Mion, PLLC

(57) ABSTRACT

Provided are a method and apparatus for providing/receiving a service from a plurality of service providers. In the method, in order to receive a service from a plurality of Internet protocol television (IPTV) service providers, a client receives information regarding at least one of a feed that syndicates web information and a web-based application from a server of a service provider selected from the IPTV service providers. Then, the client requests the server to provide a service providing at least one of the feed and the application based on the received information, and receives the service from the server. Accordingly, it is possible to provide or receive web-based services via an IPTV network.

8 Claims, 4 Drawing Sheets

(51) Int. Cl.
*H04N 21/61* (2011.01)
*H04N 7/173* (2011.01)

(56) References Cited

U.S. PATENT DOCUMENTS

| | | | |
|---|---|---|---|
| 6,286,047 B1* | 9/2001 | Ramanathan et al. | 709/224 |
| 6,415,280 B1* | 7/2002 | Farber et al. | 707/698 |
| 6,724,403 B1* | 4/2004 | Santoro et al. | 715/765 |
| 7,089,585 B1* | 8/2006 | Dharmarajan | 726/8 |
| 7,213,062 B1* | 5/2007 | Raciborski et al. | 709/223 |
| 7,353,295 B1* | 4/2008 | Crow et al. | 709/245 |
| 7,631,260 B1* | 12/2009 | Riggs et al. | 715/716 |
| 7,640,184 B1* | 12/2009 | Lunt | 709/217 |
| 2002/0067376 A1* | 6/2002 | Martin et al. | 345/810 |
| 2002/0143819 A1* | 10/2002 | Han et al. | 707/513 |
| 2002/0160752 A1* | 10/2002 | Hook et al. | 455/412 |
| 2003/0005132 A1* | 1/2003 | Nguyen et al. | 709/229 |
| 2003/0079020 A1* | 4/2003 | Gourraud et al. | 709/227 |
| 2004/0004968 A1* | 1/2004 | Nassar | 370/401 |
| 2004/0015405 A1* | 1/2004 | Cloutier et al. | 705/26 |
| 2004/0078825 A1* | 4/2004 | Murphy | 725/109 |
| 2004/0230996 A1* | 11/2004 | Takeuchi et al. | 725/109 |
| 2005/0021670 A1* | 1/2005 | Maes | 709/217 |
| 2005/0042983 A1* | 2/2005 | Borgward | 455/3.06 |
| 2005/0111441 A1* | 5/2005 | Koskelainen | 370/352 |
| 2005/0198188 A1* | 9/2005 | Hickman | 709/217 |
| 2005/0198677 A1* | 9/2005 | Lewis | 725/87 |
| 2005/0216940 A1* | 9/2005 | Black | 725/87 |
| 2005/0283791 A1* | 12/2005 | McCarthy et al. | 725/1 |
| 2006/0053077 A1* | 3/2006 | Mourad et al. | 705/51 |
| 2006/0112141 A1* | 5/2006 | Morris | 707/104.1 |
| 2006/0248570 A1* | 11/2006 | Witwer | 725/135 |
| 2007/0061724 A1* | 3/2007 | Slothouber et al. | 715/716 |
| 2007/0083908 A1* | 4/2007 | McCarthy et al. | 725/112 |
| 2007/0101351 A1* | 5/2007 | Bagsby et al. | 725/1 |
| 2007/0123253 A1* | 5/2007 | Simongini et al. | 455/433 |
| 2007/0130601 A1* | 6/2007 | Li et al. | 725/112 |
| 2007/0162945 A1* | 7/2007 | Mills | 725/119 |
| 2007/0192807 A1* | 8/2007 | Howcroft | 725/86 |
| 2007/0208670 A1* | 9/2007 | Quoc | 705/59 |
| 2007/0258701 A1* | 11/2007 | Lee et al. | 386/96 |
| 2007/0283385 A1* | 12/2007 | Qiu et al. | 725/34 |
| 2007/0288478 A1* | 12/2007 | DiMaria et al. | 707/10 |
| 2007/0297544 A1* | 12/2007 | Choi et al. | 375/346 |
| 2008/0002674 A1* | 1/2008 | Lubbers et al. | 370/352 |
| 2008/0010372 A1* | 1/2008 | Khedouri et al. | 709/224 |
| 2008/0083004 A1* | 4/2008 | Kim et al. | 725/114 |
| 2008/0098450 A1* | 4/2008 | Wu et al. | 725/132 |
| 2008/0127255 A1* | 5/2008 | Ress et al. | 725/38 |
| 2008/0127259 A1* | 5/2008 | Hong et al. | 725/39 |
| 2008/0148319 A1* | 6/2008 | Facemire et al. | 725/58 |
| 2008/0148322 A1* | 6/2008 | Howcroft | 725/87 |
| 2008/0168496 A1* | 7/2008 | Lee et al. | 725/39 |
| 2008/0172701 A1* | 7/2008 | Hong et al. | 725/87 |
| 2008/0178248 A1* | 7/2008 | Kim et al. | 725/134 |
| 2008/0201723 A1* | 8/2008 | Bottaro et al. | 719/316 |
| 2008/0209483 A1* | 8/2008 | Lemmers et al. | 725/105 |
| 2008/0244710 A1* | 10/2008 | Foti | 726/4 |
| 2008/0256232 A1* | 10/2008 | Fleury et al. | 709/224 |
| 2009/0047016 A1* | 2/2009 | Bernard et al. | 398/43 |
| 2009/0083289 A1* | 3/2009 | Morris | 707/10 |
| 2009/0174821 A1* | 7/2009 | Matsuo et al. | 348/553 |
| 2009/0307307 A1* | 12/2009 | Igarashi | 709/203 |
| 2010/0313231 A1* | 12/2010 | Okamoto et al. | 725/110 |

FOREIGN PATENT DOCUMENTS

| | | | | |
|---|---|---|---|---|
| KR | 1020060021485 A | | 3/2006 | |
| WO | 03/025793 A1 | | 3/2003 | |
| WO | WO 2004/059502 A1 | * | 7/2004 | G06F 15/16 |
| WO | WO 2008/084965 | * | 7/2008 | H04N 5/193 |

OTHER PUBLICATIONS

Peltotalo et al. A Massively Scalable Persistent Content Distribution System.*
Chiao et al. Video Everywhere Through a Scalable IP-Streaming Service Framework, in: International Symposium on Wireless Communication Systems (ISWCS) Sep. 2006, pp. 190-194.*
Advogato, RSS Disposition Hinting Proposal Aug. 2005 /www.advogato.org/article/852.html.*
Sheldon et al—Discover: A resource discovery system based on content routing, In Proceedings of the 3rd International World Wide Web Conference (1995) drakkar.imag.fr/publications/duda/www95.pdf.*
]ETSI, IPTV architecture: Dedicated subsystem for IPTV functions in NGN , ETSI DTS 02049 V0.06 (May 2007).*
Robert B. Johansson, Thesis: Design and implementation of a prototype home media system for an IP-based set-top box, Linköping Institute of Technology Dept. of Computer and Information Science, Jun. 1, 2004.*
ETSI, IPTV architecture: Dedicated subsystem for IPTV functions in NGN , ETSI DTS 02049 V0.06 (May 2007).*
GloServ: Global Service Discovery Architecture, (MobiQuitous'04), IEEE (2004).*
Czerwinski et al, An Architecture for a Secure Service Discovery Service, Mobicom '99, ACM 1999.*
RFC 2108 SLP version 2 IETF (Jun. 1999).*
RFC 2131, DHCP, Mar. 1997.*
RFC 2610—DHCP Options for SLP (Jun. 1999).*
Campo et al—PDP and GSDL: a new service discovery middleware to support spontaneous interactions in pervasive systems (PerCom 2005 Workshops), IEEE (2005).*
Hodes et al, An Architecture for SecureWide-Area Service Discovery, Wireless Networks 8, 213-230, 2002.*
Limam et al OSDA: Open service discovery architecture for efficient cross-domain service provisioning, Computer Communications 30 (2007) 546-563.*
Zhaio et al—Remote Service Discovery in the Service Location Protocol via DNS SRV, 2004 draft-zhao-slp-remote-da-discovery-05.txt.*
ETSI. Digital Video Broadcasting (DVB); Transport of MPEG-2 Based DVB Services over IP Based Networks,ETSI TS 102 034 V1.2.1 (Sep. 2006).*
ETSI, IPTV architecture: Dedicated subsystem for IPTV functions in NGN , ETSI DTS 02049 V0.0.9 (Sep. 2007).*
Universal Plug and Play Device Architecture, Version 1.0, (Jun. 2000).*
Peltotalo et al. A Massively Scalable Persistent Content Distribution System, in: International Conference on Communications, Internet and Information Technology (CIIT) , Banff, Alberta, Canada, Jul. 2-4, 2007.*
Bettstetter, and Renner. "A comparison of service discovery protocols and implementation of the service location protocol." Proceedings of the 6th EUNICE Open European Summer School: Innovative Internet Applications. (2000).*
Rao et al , Introduction to Multimedia Communications: Applications, Middleware, Networking, Wiley & Sons, 2006—Ch 1, 4.*
Campo et al, PDP and GSDL: a new service discovery middleware to support spontaneous interactions in pervasive systems, PerCom 2005 Workshops, IEEE (2005), pp. 178-183.*
RFC 2165—SLP IETF (Jun. 1997).*
RFC 2608 SLP version 2 IETF (Jun. 1999).*
RFC 2610—DHCP Options for SLP (Jun. 1999).*
RFC 2782: "A DNS RR for specifying the location of services (DNS SRV)", IETF (Feb. 2000).*
Rosenberg et al, Wide Area Network Service Location, IETF, 1997 draft-ietf-svrloc-wasrv-01.txt.*
Zhao et al—Remote Service Discovery in the Service Location Protocol via DNS SRV, 2004 draft-zhao-slp-remote-da-discovery-05.txt.*
Communication, dated Apr. 9, 2014, issued by the Korean Intellectual Property Office in counterpart Korean Patent Application No. 10-2008-0033354.
Communication dated Oct. 23, 2014, issued by the Korean Intellectual Property Office in counterpart Korean Application No. Oct. 2008-0033354.

* cited by examiner

METHOD AND APPARATUS FOR PROVIDING/RECEIVING WEB-BASED SERVICE OF PLURALITY OF SERVICE PROVIDERS

CROSS-REFERENCE TO RELATED PATENT APPLICATIONS

This application claims the benefit of U.S. Provisional Application No. 60/954,099, filed on Aug. 6, 2007, in the US PTO, and Korean Patent Application No. 10-2008-0033354, filed on Apr. 10, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to providing/receiving a service from a plurality of service providers, and more particularly, to a method and apparatus for searching for and receiving a desired service from among web-based services from a plurality of service providers.

2. Description of the Related Art

Internet Protocol Television (IPTV) includes a service providing information, moving picture content and a broadcast to a TV via an IP network, i.e., ultra high speed Internet. Since integrated services with communication and broadcasting have become available, much attention has been paid to IPTV, and activation of IPTV is expected to significantly affect not only communication and broadcasting industries but also content creation and household appliance industries.

In order to allow a client to receive an IPTV service via an IP network, an additional IPTV set top box is needed. That is, only clients having an IPTV set top box manufactured according to specifications determined by a service provider who provides an IPTV service can receive the IPTV service. For example, if IPTV service providers of three companies, i.e., an A company, a B company and a C company, are present, a service consumer purchasing a set top box of the A company can use only an IPTV service provided from the A company, and must further purchase a set top box from the B or C company in order to use an IPTV service of the B or C company, respectively. An IPTV network unique to a service provider is referred to as a managed network. Under a managed network, incompatibility between an IPTV service provider and a set top box reduces the range of selection of a service consumer, thereby degrading the quality of an IPTV service or preventing the fundamentals of IPTV service from being increased.

In order to solve incompatibility between an IPTV service provider and a set top box, the Open IPTV Forum that have been recently formed is conducting a discussion about standards for IPTV services. The Open IPTV Forum is discussing the creation of common standards independent of an IPTV service provider and the provision of an IPTV service based on the standards to a service consumer.

Open IPTV is aiming at making an interface and hardware platform that are independent of an IPTV service provider so that IPTV services can be received from a plurality of IPTV service providers via one set top box. According to Open IPTV, since all services provided from a plurality of IPTV service providers can be used via one set top box, the range of service selection of a service consumer can be increased.

The standards for IPTV services are now being established so that not only IPTV services that are provided via a conventional managed network and are independent of an IPTV service provider but also IPTV services that are provided via an open Internet network and are independent of an IPTV service provider can be provided via one set top box.

SUMMARY OF THE INVENTION

The present invention provides a method and apparatus for searching for and receiving a desired service from among web-based services provided from a plurality of service providers.

The present invention also provides a computer readable recording medium having recorded thereon a computer program for executing the method.

According to an aspect of the present invention, there is provided a method of allowing a client to receive services from a plurality of service providers, the method comprising receiving information regarding at least one service that is to be received from a server of a service provider selected from among the plurality of service providers, from a search server; requesting the server to provide a predetermined service from among the at least one service, based on the received information; and receiving the predetermined service provided from the server in response to the request, wherein the service is a web-based service.

The at least one service may comprise IPTV (Internet protocol television) services, and the service providers may comprise a plurality of IPTV service providers.

The web-based service may provide at least one of a feed that syndicates web information and a web-based application.

The feed may comprise an RSS (really simple syndication) feed.

The web-based application may comprise a widget.

According to another aspect of the present invention, there is provided a method of allowing a search server to provide a client with information regarding at least one service provided from a plurality of service providers, the method comprising receiving and registering the information regarding the at least one service from a plurality of servers of the plurality of service provides; and providing the registered information to the client, wherein the at least one service comprises a web-based service.

According to another aspect of the present invention, there is provided a method of allowing a server of a service provider to provide a predetermined service to a client, the method comprising registering information regarding at least one service that is to be provided from the service provider with a search server; receiving a request for a predetermined service, which is made based on the registered information, from the client; and providing the predetermined service to the client in response to the request, wherein the search server provides the client with information regarding at least one service provided from a plurality of service providers including the service provider, and the predetermined service is a web-based service.

According to another aspect of the present invention, there is provided a client for receiving services from a plurality of service providers, the client comprising a service search unit receiving information regarding at least one service that are to be received from a server of a service provider selected from the plurality of service providers, from a search server; and a service receiving unit requesting the server to provide a predetermined service from among the at least one service, based on the received information, and receiving the predetermined service provided from the server in response to the request, wherein the predetermined service is a web-based service.

According to another aspect of the present invention, there is provided a server of a service provider providing a predetermined service to a client, the server comprising an information registration unit registering information regarding at least one service that is to be provided from the service provider, with a search server; and a service providing unit receiving a request for a predetermined service, which is made based on the registered information, from the client, and providing the predetermined service to the client in response to the request, wherein the search server provides the client with information regarding at least one service provided from a plurality of service providers including the service provider, and the predetermined service is a web-based service.

According to another aspect of the present invention, there is provided a computer readable medium having recorded thereon a computer program for executing the above methods.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
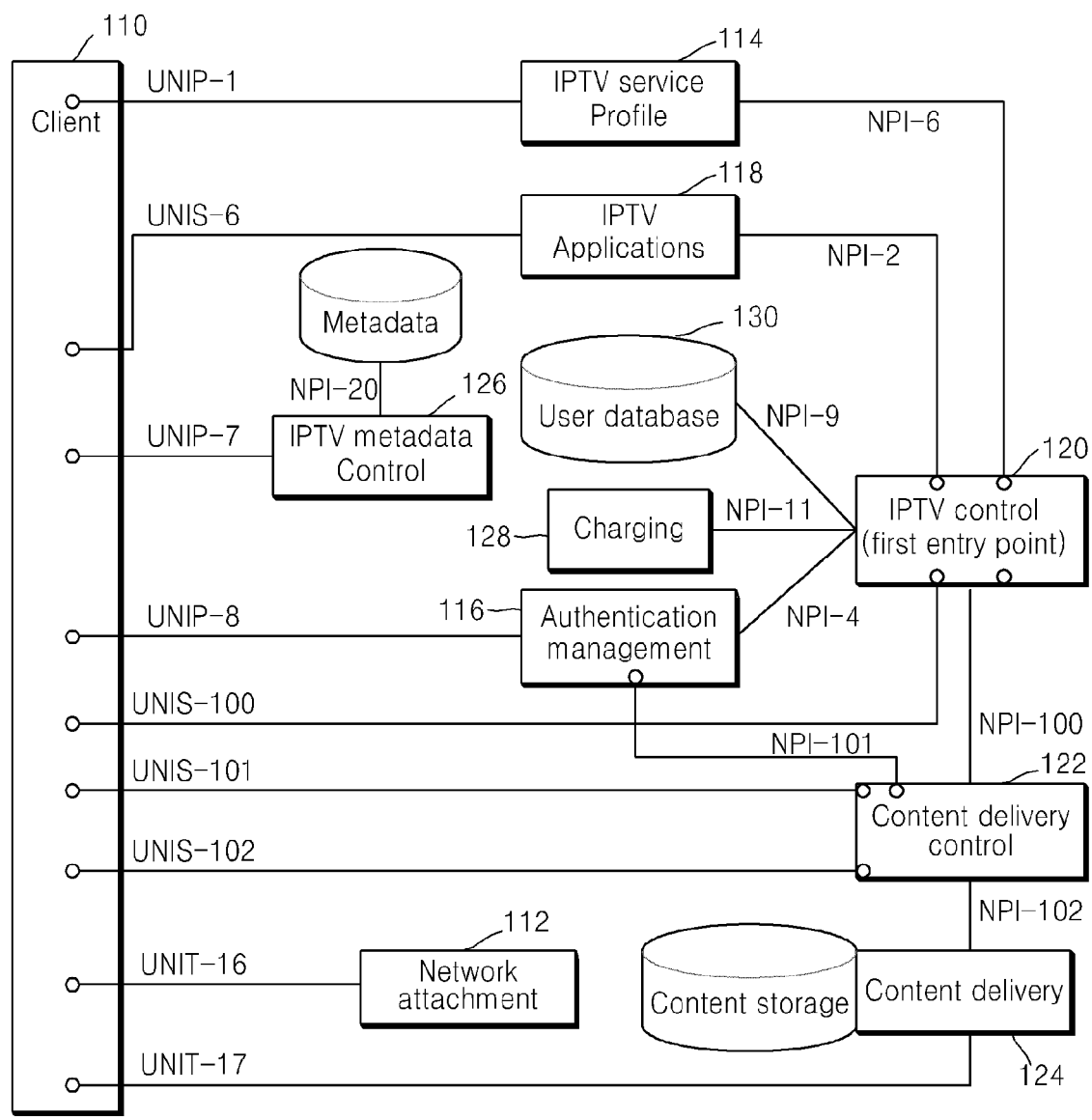
FIG. 1 illustrates an Internet protocol television (IPTV) network according to an embodiment of the present invention.

FIG. 1 illustrates an Internet Protocol Television (IPTV) network according to an embodiment of the present invention. Referring to FIG. 1, the IPTV network includes a client 110 and a plurality of IPTV entities. The IPTV entities include a network attachment entity 112, an IPTV service profile entity 114, an authentication management entity 116, an IPTV applications entity 118, an IPTV control entity 120, a content delivery control entity 122, a content delivery entity 124, an IPTV metadata control entity 126, a charging entity 128, and a user database entity 130.

The network attachment entity 112 allocates an IP address to the client 110, and performs network-level user authentication and network configuration. In an open IPTV network, an Internet service provider provides the network attachment entity 112.

The IPTV service profile entity 114 retains user profile information of the client 110 related to an IPTV service. When the client 110 requests a service, the user profile information is referred to. For example, the user profile information is referred to in order to provide the client 110 with a personalized IPTV service.

The authentication management entity 116 is charged with authentication of the client 110.

The IPTV applications entity 118 is a server managed by each IPTV service provider. Here, an IPTV service includes not only a TV service, such as linear TV, but also an IPTV application, such as CoD (content on demand), Push CoD, content downloading, network PVR (Personal Video Recoding), and messaging. The IPTV applications entity 118 can provide a graphic user interface (GUI) and service data to the client 110, using web-based techniques.

The IPTV control entity 120 provides the client 110 with information regarding the IPTV applications entity 118. For example, the IPTV control entity 120 provides a list of universal resource locators (URLs) of the IPTV applications entity 118. In this case, the list of URLs may be provided via a GUI. The IPTV control entity 120 controls delivery of an IPTV service for an authenticated user, and interacts with the authentication management entity 116 to this end. The IPTV control entity 120 can access the IPTV service profile entity 114 in order to provide an individualized IPTV service. If an advertisement needs to be included in an IPTV service, the IPTV control entity 120 accesses an IPTV applications entity providing the advertisement and controls inclusion of the advertisement.

The content delivery control entity 122 protects content and controls streaming reproduction. The content delivery control entity 122 checks whether a request from the client 110 is available, and checks whether a content access key transmitted from the client 110 is valid, before content delivery begins. Also, the content delivery control entity 122 manages a digital rights management (DRM) key and content encryption. The content delivery control entity 122 may update the DRM key by receiving related data from the authentication management entity 116. The content delivery control entity 122 may also control content reproduction during the content reproduction, i.e., streaming reproduction.

The content delivery entity 124 is charged with content processing, delivery and distribution, under control of the content delivery control entity 122.

The IPTV metadata control entity 126 collects meta data about IPTV services provided via the IPTV network from a content provider, and provides it to the client 110.

The charging entity 128 provides an IPTV service charging mechanism. IPTV service providers can individually make their own charging system.

The user database entity 130 retains information regarding the client 110. Each IPTV service provider can build a user database and store information, such as authentication information, which is not related to an IPTV service, in the user database.

Referring to FIG. 1, the client 110 and the entities 112 through 130 exchange a control signal with one another via a predetermined interface. The name of each of the interfaces illustrated in FIG. 1 is optionally selected and thus may be replaced with another name which appropriately represents the function of the interface.

UNIP-1 denotes an interface for managing a user service profile. That is, the UNIP-1 is an interface defining control and access between the client 110 and the IPTV service profile entity 114.

UNIP-7 denotes an interface allowing guide information of service or program to be used in a predetermined metadata format during a search for the service. Data for guiding at least one IPTV service is stored in a metadata storage unit. An IPTV service provider or a service platform provider can modify metadata stored in the metadata storage unit.

UNIP-8 denotes an interface for performing authentication when the client 110 tries to access an IPTV service.

UNIS-6 denotes an interface defined for the client 110 to request the IPTV applications entity 118 to provide a predetermined IPTV service. That is, the UNIS-6 is an interface allowing the client 110 to request the IPTV applications entity 118 (server that provides an IPTV service) to provide a predetermined IPTV service, and to receive the predetermined service in response to the request. The client 110 can access the IPTV applications entity 118 as guided by a GUI containing the URL or link information of the IPTV applications entity 118, which is received from the IPTV control entity 120. UNIS-6 may define an authentication process of checking an identifier or password of the client 110 if necessary.

UNIS-100 denotes an interface for the client 110 to receive information regarding IPTV services that can be received via the IPTV network, from the IPTV control entity 120. In this case, the client 110 may receive a GUI containing links to the IPTV services or create a page containing the links to the IPTV services by receiving only guide data regarding the IPTV services.

UNIS-101 denotes an interface defining control of content reproduction. UNIS-101 allows control of content reproduction, such as pausing, stopping, or fast forwarding, during receiving and reproducing content, e.g., streaming data, from the content delivery entity 124.

UNIS-102 denotes an interface for managing and controlling a DRM key while the client 110 receives content.

UNIT-16 denotes an interface necessary for the client 110 to access the IPTV network.

UNIT-17 denotes an interface defined in order to transmit content data to the client 110 through unicasting, multicasting or downloading. In this case, real-time transmission or non real-time transmission may be defined.

NPI-6 denotes an interface defined for the IPTV control entity 120 to access and manage the user profile information stored in the IPTV service profile entity 114. The IPTV control entity 120 accesses the user profile information in order to provide the client 110 with an individualized IPTV service.

NPI-2 denotes an interface defined for the IPTV applications entity 118 to register data regarding an IPTV service with the IPTV control entity 120 or cancel the data from the IPTV control entity 120. NPI-2 can also be used when the IPTV applications entity 118 registers information regarding NPI-9 denotes an interface defined for the IPTV control entity 120 to access and manage user information stored in the user database entity 130.

NPI-11 denotes an interface for retaining charging data generated when a user views content.

NPI-4 denotes an interface for preventing information regarding IPTV services from being illegally used and checking whether the client 110 is an authenticated user, before the information is provided to the client 110.

NPI-20 denotes an interface for the IPTV metadata control entity 126 to control the metadata storage unit.

NPI-100 denotes an interface for the IPTV control entity 120 to begin or manage content delivery.

NPI-101 denotes an interface for managing authentication information related to content delivery.

NPI-102 denotes an interface for the content delivery control entity 122 to control the content delivery entity 124 to control content delivery. NPI-102 may also define encryption of content.

Figure 2:
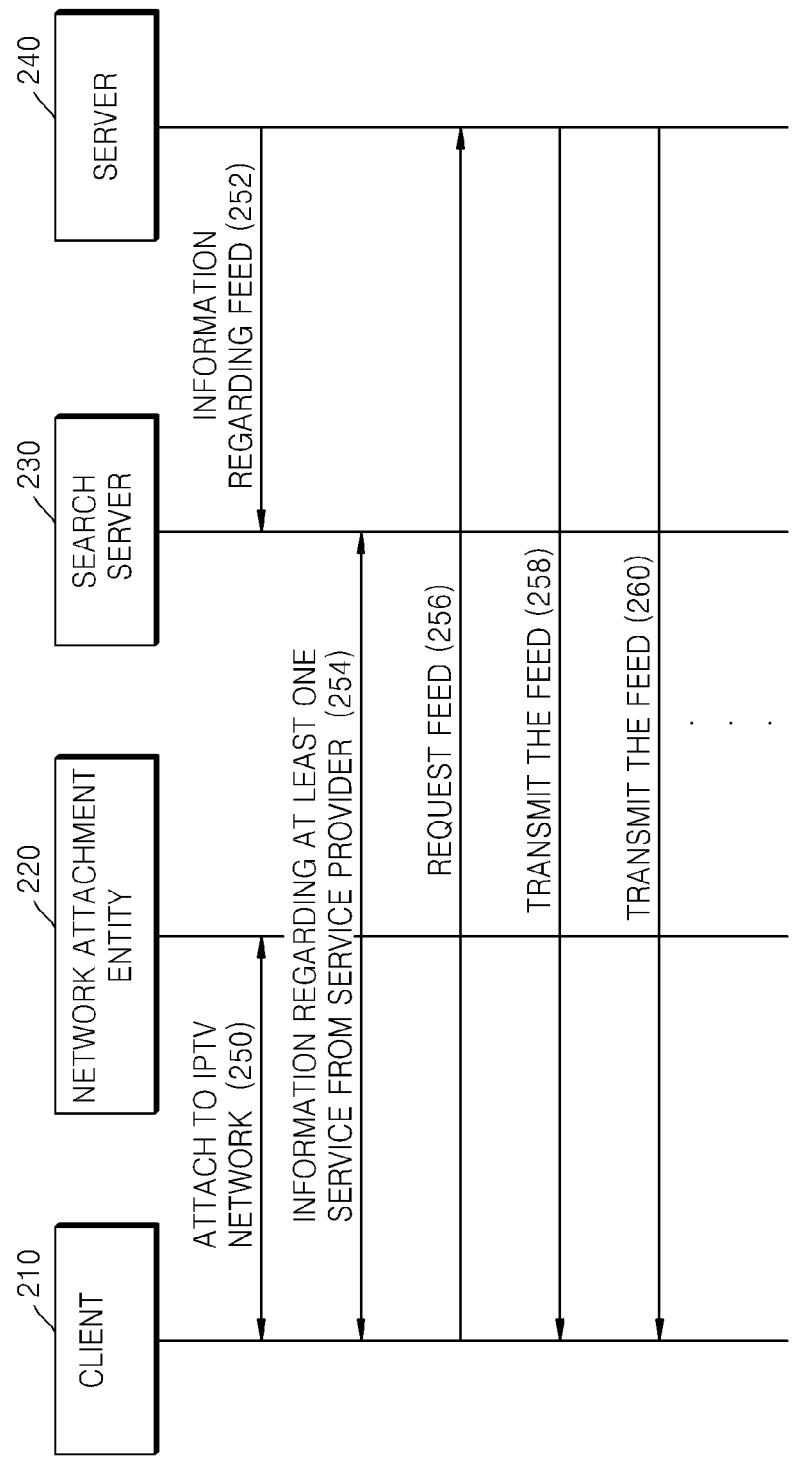
FIG. 2 is a flowchart illustrating a method of providing/receiving a web-based service according to an embodiment of the present invention.

FIG. 2 is a flowchart illustrating a method of providing/receiving a web-based service according to an embodiment of the present invention. In detail, FIG. 2 illustrates a method of allowing a client 210 to receive a web-based service from a server 240 of a service provider. It is assumed that the client 210 is an IPTV service client, such as an IPTV set top box, and the server 240 is an IPTV service server that provides an IPTV service. However, it would be obvious to those of ordinary skill in the art that the present invention can be applied to not only a method and apparatus for providing/receiving an IPTV service but also a method and apparatus for providing/receiving services of a plurality of service providers.

Hereinafter, it is understood that a method and apparatus for providing/receiving a service according to the present invention can be used to provide or receive at least one of an IPTV service received via a managed network and an IPTV service received via an open Internet network.

Referring to FIG. 2, in operation 250, the client 210 accesses a network attachment entity 220 in order to access an IPTV network according to the present invention. The network attachment entity 220 provides an IP address to the client 210 so that the client 210 can access the IPTV network, and performs network-level authentication and network construction. In the open Internet network, an Internet service provider (ISP) that provides an Internet service provides the network attachment entity 220.

Information regarding a search server 230 may be provided to the client 210 while network attachment is made in operation 250. In operations 254 and 256, in order to access the search server 230 and the server 240, the client 210 must know the address of the search server 230 that is to be first accessed. When network attachment is made in operation 250, the URL of the search server 230 may be provided to the client 210. If the client 210 has already known the URL of the search server 230, the URL of the search server 230 does not need to be additionally provided to the client 210.

In operation 252, the server 240 registers information regarding at least one of services that the server 240 can provide with the search server 230. The server 240 is a server of a service provider from among a plurality of service providers, and provides at least one IPTV service of the service provider. Here, the IPTV service includes services, such as linear TV, CoD (content on demand), Push CoD, content downloading, network PVR, and messaging. Also, a web-based service may further be included in the IPTV service.

FIG. 2 illustrates a service that provides the client 210 with a feed providing web information from among web-based services. In operation 252, the server 240 transmits information regarding a feed that syndicates web information to the search server 230. For example, the server 240 transmits information regarding a really simple syndication (RSS) feed to the search server 230. Operation 252 is performed using an interface defined between the search server 230 and the server 240 in order to register information regarding a service with the search server 230 or delete the information from the search server 230.

The search server 230 is an entity that provides the client 210 with information regarding IPTV services that can be provided via the IPTV network. The search server 230 stores not only information regarding IPTV services that the service provider can provide but also information regarding IPTV services that a plurality of service providers can provide in the IPTV network accessed by the client 210. Thus, the client 210 can obtain information regarding all IPTV services including a service that provides a feed by accessing the search server 230.

In operation 254, the client 210 receives information regarding at least one of services of a plurality of service providers from the search server 230. The information regarding at least one IPTV service including a service providing a feed is received from the search server 230. The client 210 may receive information regarding at least one of IPTV services that the client 210 can receive from a service provider selected from among a plurality of service providers, from the search server 230. The address, e.g., the URL, of a feed that the server 240 provides is provided to the client 210 as information regarding a feed that syndicates web information. Operation 254 is performed using an interface defined between the client 210 and the search server 230 in order to provide information regarding a service.

The client 210 can perform authentication by accessing a predetermined entity (authentic management entity) that performs authentication management using an interface for authentication, and receive information regarding an IPTV service from the search server 230 after the authentication is completed. When the client 210 tries to access the search server 230 for the first time, the search server 230 first requests the client 210 to receive authentication from the authentication management entity. The client 210 receiving the request, requests the authentication management entity to authenticate the client 210. The authentication management entity may perform authentication by transmitting the result of the authentication to the client 210 and the search server 230. Alternatively, authentication may be performed by transmitting an encryption key for accessing the search server 230 to the client 210.

In operation 256, the client 210 requests to provide a predetermined service, i.e., a service providing a feed, based on the information regarding the IPTV service, which was received in operation 254. The client 210 selects the predetermined service based on the information regarding the IPTV services received in operation 254, and requests the server 240 to provide the selected service. Here, the predetermined service provides a feed.

In operation 258, the client 210 receives the feed from the server 240. That is, the client 210 receives the feed requested in operation 256.

In operation 260, the client 210 receives the feed again from the server 240. The server 240 periodically transmits the feed to the client 210 so that the client 210 can periodically update web information. Operations 256 through 260 are performed using an interface defined between the client 210 and the server 240 in order to request and transmit a service.

The client 210 can request web information based on the received feed. For example, the client 210 can request the server 240 to transmit audio/video (AV) content based on the received feed.

Figure 3:
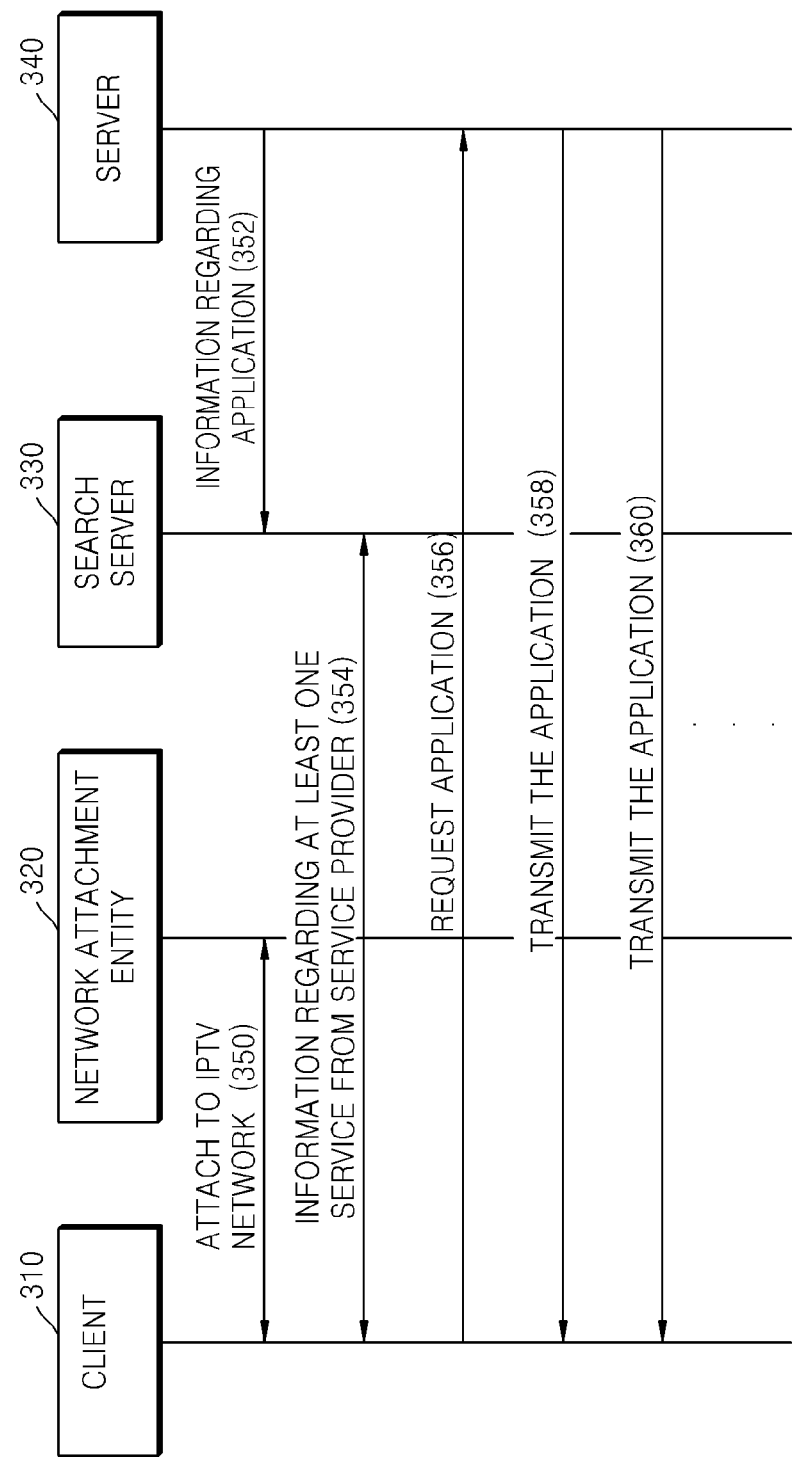
FIG. 3 illustrates a method and apparatus for providing/receiving a web-based service according to another embodiment of the present invention.

FIG. 3 illustrates a method and apparatus for providing/receiving a web-based service according to another embodiment of the present invention. In detail, FIG. 3 illustrates a method of providing/receiving a service that provides a web-based application as a web-based service.

Referring to FIG. 3, in operation 350, a client 310 accesses a network attachment 320 in order to access an IPTV network according to the present invention. Operation 350 is the same as operation 250 illustrated in FIG. 2.

In operation 352, a server 340 registers information regarding at least one service that the server 340 can provide, with a search server 330. An IPTV service according to an embodiment of the present invention includes a service providing a web-based application as illustrated in FIG. 3. In operation 352, the server 340 registers information regarding at least one web-based application that can be provided to the client 310, with the search server 330. For example, the server 340 transmits information regarding a widget that the server 340 provides to the search server 330. Operation 352 is performed using an interface defined between the search server 330 and the server 340 in order to register information regarding a service with the search server 330 or cancel the information from the search server 330.

In operation 354, the client 310 receives information regarding at least one service of a service provider from the search server 330. The client 310 receives information regarding at least one IPTV service including a service that provides a web-based application from the search server 330. The client 310 may select the service provider from among a plurality of service providers, and receive information regarding at least one IPTV service that the selected service provider can provide to the client 310, from the search server 230. Information regarding the URL of a web-based application is received as information regarding the web-based application.

Operation 354 is performed using an interface defined between the client 310 and the search server 330 in order to provide information regarding a service.

In operation 356, the client 310 requests a predetermined service, i.e., a service providing a web-based application, based on the information regarding the IPTV service received in operation 354. The client 310 selects the predetermined service based on the information regarding IPTV services received in operation 354, and requests the server 340 to provide the selected service.

In operation 358, the client 310 receives the web-based application from the server 340. That is, the client 310 receives the web-based application requested in operation 356. Operations 356 and 358 are performed using an interface defined between the client 310 and the server 340 I order to request and transmit a service.

In operation 360, the client 310 uses a predetermined service by using the web-based application received from the server 340. For example, the client 310 may receive a streaming service of AV content that the server 340 provides, by using the web-based application, e.g., the widget.

FIGS. 2 and 3 illustrate that one client receives a service providing a feed or a web-based application from one server but the client can receive a feed or a web-based application from more than one server at the same time. Also, the client can update web information by simultaneously receiving two or more feeds, and receive a service from two or more servers by simultaneously driving a plurality of web applications.

Also, a feed and a web-based application can also be simultaneously received from one server. An RSS feed and a widget can also be simultaneously received from a server that can simultaneously provide a service providing a feed and a service providing a web-based application.

Figure 4:
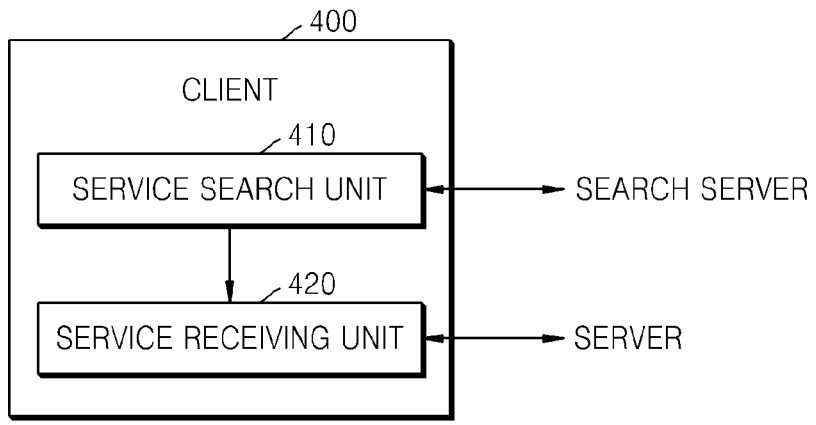
FIG. 4 is a block diagram of a client according to an embodiment of the present invention.

FIG. 4 is a block diagram of a client 400 according to an embodiment of the present invention. Referring to FIG. 4, the client 400 includes a service search unit 410 and a service receiving unit 420.

The service search unit 410 receives information regarding at least one service that a plurality of service providers provide, from a search server. The client 400 is an IPTV client, and thus receives information regarding at least one IPTV service of a plurality of service providers, from the search server via an IPTV network. The client 400 may select a service provider from among a plurality of service providers, and receives information regarding at least one service that the service provider provides.

The information regarding at least one IPTV service may include information regarding a web-based service. The web-based service may provide at least one of a feed that syndicates web information and a web-based application.

The service receiving unit 420 requests a server to provide a predetermined service selected from among at least one service that can be received from the server, and receives the service provided from the server in response to the request. The service receiving unit 420 requests the server to provide at least one of a feed and a web-based application, and receives at least one of the feed and the web-based application.

Figure 5:
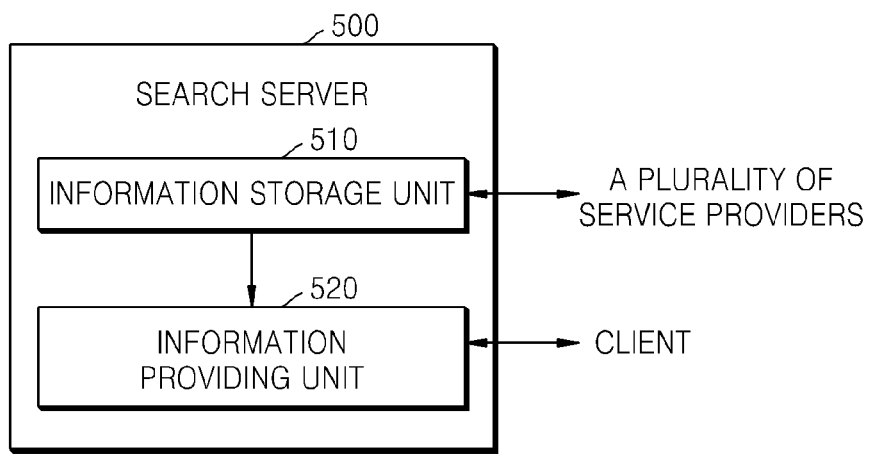
FIG. 5 is a block diagram of a search server according to an embodiment of the present invention.

FIG. 5 is a block diagram of a search server 500 according to an embodiment of the present invention. Referring to FIG. 5, the search server 500 includes an information storage unit 510 and an information providing unit 520.

The information storage unit 510 receives information regarding a service provider and/or information regarding a service from a plurality of service providers in an IPTV network. Information regarding an IPTV service that the information storage unit 510 receives from a plurality of service providers, includes information regarding a web-based service.

The information providing unit 520 provides a client with information regarding at least one service of a plurality of service providers. The information regarding at least one service, including information regarding a web-based service, is provided to the client. For example, information regarding at least one of the URL of a feed that syndicates web information and a URL via which a web-based application can be received, is provided to the client.

Figure 6:
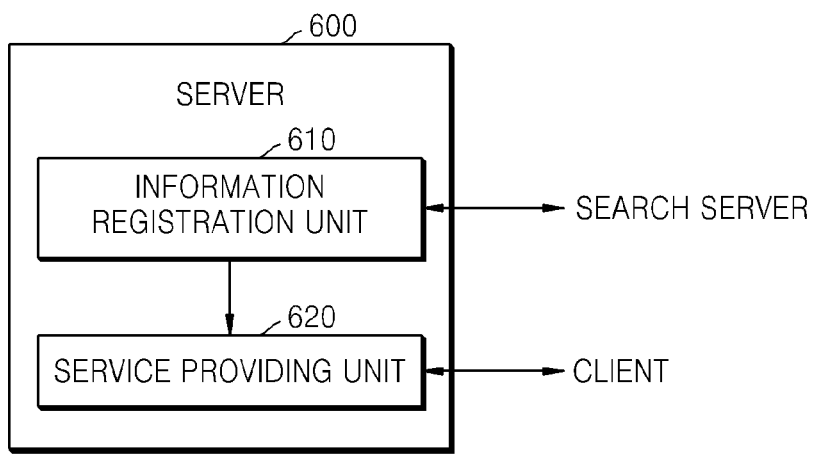
FIG. 6 is a block diagram of a server according to an embodiment of the present invention.

FIG. 6 is a block diagram of a server 600 according to an embodiment of the present invention. Referring to FIG. 6, the server 600 that provides an IPTV service in an IPTV network includes an information registration unit 610 and a service providing unit 620. It is assumed that the server 600 is a server of a service provider from among a plurality of service providers in an IPTV network.

The information registration unit 610 registers information regarding at least one service that the service provider can provide, with a search server. For example, information regarding a web service that the service provider can provide is registered with the search server.

When receiving a request for a predetermined service from a client, the service providing unit 620 provides the service to the client in response to the request. For example, the service is provided to a client authenticated by a predetermined authentication management entity. A feed or a web-based application may be provided in response to a request for a web service from the client.

The system according to the present invention can be embodied as computer readable code in a computer readable recording medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system.

According to the above embodiments of the present invention, a client can precisely search for and receive a desired service in a predetermined network in which a plurality of service providers provide a service. In particular, a web-based service can be received via an IPTV network, thereby maximizing utilization of an IPTV client.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of allowing a client to receive a plurality of services from a plurality of service providers, the method comprising:

receiving, by the client, information regarding at least one service that is to be received from a first server of a service provider selected from among the plurality of service providers, from a second server; wherein the information regarding the at least one service comprises information regarding a Universal Resource Locator (URL) of a web-based application;

transmitting a request, by the client directly to the first server to provide the web-based application;

receiving the web-based application from the first server in response to the request; and receiving a predetermined service provided directly from the first server using the web-based application based on the received information, wherein the predetermined service is a web-based service, wherein the client receives information regarding the second server when network attachment is performed by the client, wherein the information regarding the second server comprises a Universal Resource Locator (URL) of the second server and the information regarding the second server is used by the client to receive service information from the second server, wherein the plurality of services comprises an Internet Protocol Television (IPTV) service, and the selected service provider is an IPTV service provider, and wherein the client receives at least one service from at least one server by simultaneously driving a plurality of web applications.

2. The method of claim 1, wherein the web-based service provides at least one of a feed that syndicates web information and a web-based application.

3. The method of claim 2, wherein the feed comprises a Really Simple Syndication (RSS) feed.

4. The method of claim 3, wherein the information regarding the plurality of services comprises information regarding a URL of the RSS feed.

5. The method of claim 3, wherein the receiving of the predetermined service comprises periodically receiving the RSS feed from the first server.

6. The method of claim 2, wherein the web-based application comprises a widget.

7. A non-transitory computer readable recording medium having recorded thereon a computer program for executing the method of claim 1.

8. The method of claim 1, wherein the client updates web information by simultaneously receiving two or more feeds from more than one server.

* * * * *